March 23, 1965     A. R. KAHN     3,174,478
LINEAR INTEGRATING CARDIOTACHOMETER
Filed March 29, 1962     2 Sheets-Sheet 1
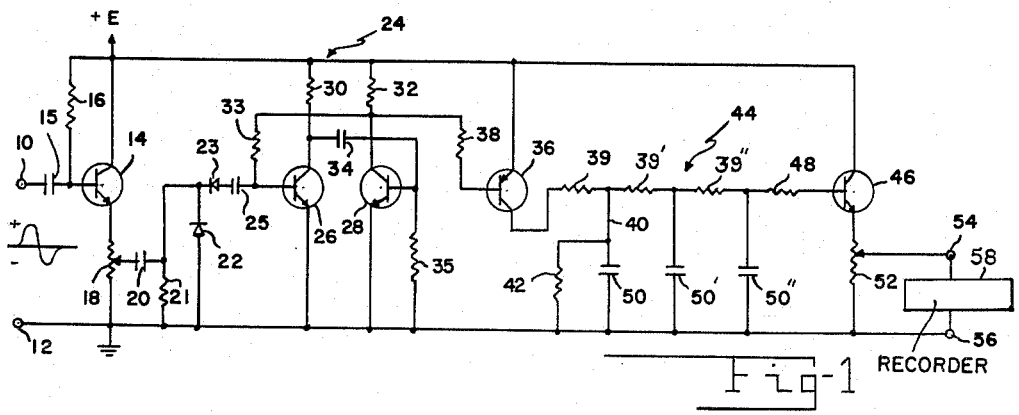
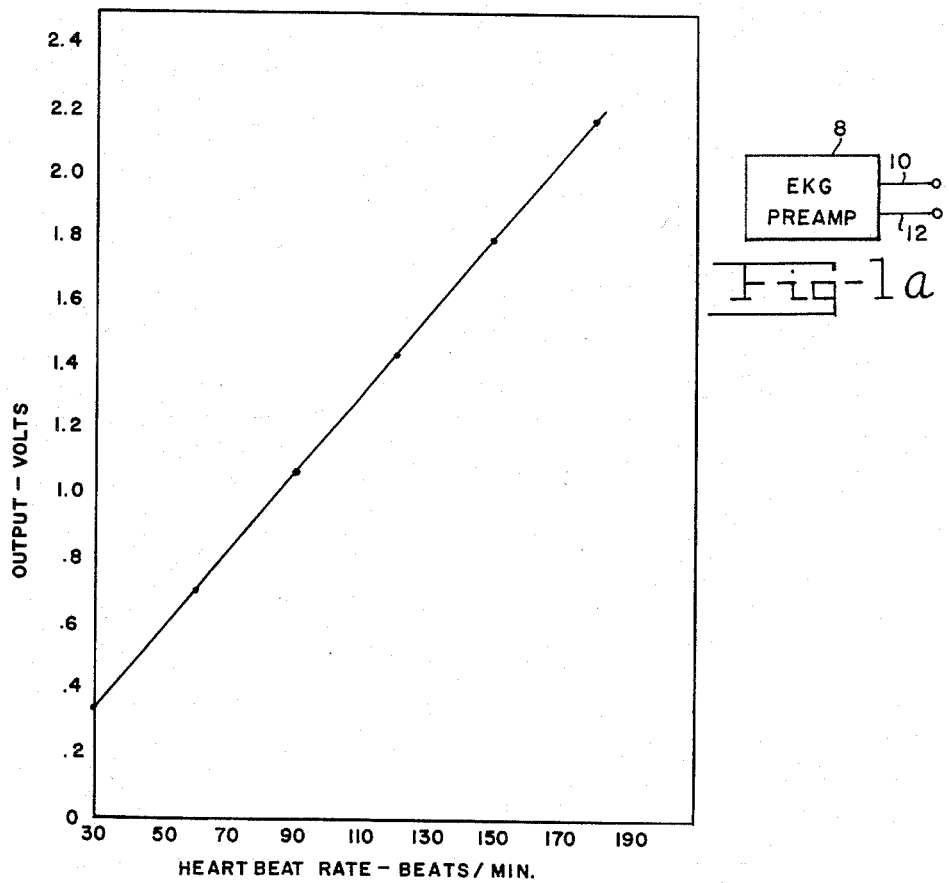
INVENTOR.
ALAN R. KAHN
BY
ATTORNEY
AGENT March 23, 1965 A. R. KAHN 3,174,478
LINEAR INTEGRATING CARDIOTACHOMETER
Filed March 29, 1962 2 Sheets-Sheet 2
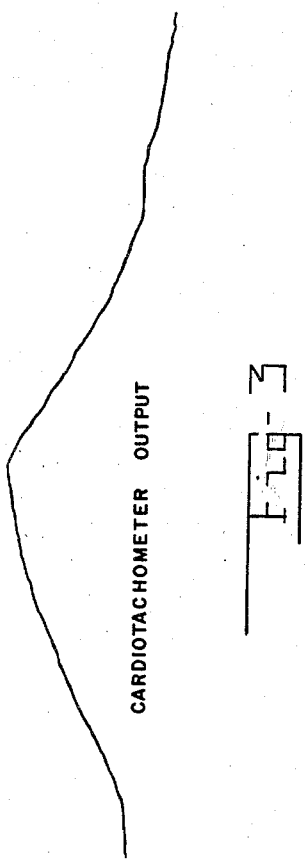
FIG. 2
INVENTOR.
ALAN R. KAHN
BY
ATTORNEY
AGENT United States Patent Office 3,174,478
Patented Mar. 23, 1965

3,174,478
LINEAR INTEGRATING CARDIOTACHOMETER
Alan R. Kahn, San Antonio, Tex., assignor to Beckman Instruments, Inc., Fullerton, Calif., a corporation of California
Filed Mar. 29, 1962, Ser. No. 183,311
3 Claims. (Cl. 128—2.06)
(Granted under Title 35, U.S. Code (1952), sec. 266)

The invention described herein may be manufactured and used by or for the United States Government for governmental purposes without payment to me of any royalty thereon.

This invention relates to a cardiotachometer and, particularly, to a cardiotachometer which facilitates the analysis of the effects of experimental procedures on a subject.

A cardiotachometer is an instrument for determining rapidity of heartbeat from the electrical potentials which occur during successive contractions of the heart muscle. Instruments of this type appear in several forms and have proven invaluable in minimizing the time and effort required to interpret large quantities of electrocardiographic data. In general, in most cardiotachometers heretofore available, the electrical impulses generated during the heartbeat of a subject under observation are first amplified following which a graphic record is prepared for the benefit of the observing cardiologist. One commonplace objective in recording techniques is to construct a permanent record of the experimental results as they actually occur so that leisurely inspection of the cardiac behavior of the subject is possible subsequent to the test period. For those test applications in which diagnostic examinations cannot be postponed and speed of interpretation of cardiac signals is essential, such as during flight situations in space vehicles or in high performance aircraft, clinical procedure is to provide the attending cardiologist with a resulting record which best enables him to judge the effects on the subject of the environmental conditions. As far as is known, cardiotachometer devices presently available commercially have the disadvantage of providing a recorded output that is nonlinear with respect to the heart rate which renders analysis by the cardiologist more difficult. Prior art cardiotachometer apparatus has moreover been found to be somewhat bulky and unstable during operation. While such shortcomings as to instability, size and nonlinearity of the output signal are not fatal to acceptable operation, they impose serious limitations on the level of diagnostic performance which can be achieved.

Accordingly, one object of the invention is to provide an improved cardiotachometer whose output is linear with respect to heartbeat rate.

Another object of the invention is the provision of a cardiotachometer that is applicable to manifold test conditions in view of extreme portability.

Still another object of the invention is to provide a cardiotachometer in which ambiguity during visual inspection of the graphic record representing the heartbeat rate is virtually eliminated.

Yet another object of the invention is the provision of a cardiotachometer which yields an output analog presentation free from distortions attributed to certain unavoidably present cardiac irregularities.

Generally, in cardiotachometer usage, the QRS complex of the electrocardiogram impulse is adopted as the source of information. As defined in clinical terminology in the cardiography field, the QRS complex is the most prominent contribution to the electrical wave produced during the rapid fluctuations known commonly as the heartbeat. The QRS complex is preceded by an initial wave termed the P wave which initiates the main complex and is followed by a final impulse referred to as the T wave. Cardiotachometer units to be reliable for the purposes intended must be capable of precisely and separately identifying the main QRS complex from the other wave components that appear in the summation of heartbeat fluctuations. The present invention has, as a particular object, the provision of a cardiotachometer having a detector circuit which is capable of isolating for identification the QRS complex of the electrocardiogram information, and simultaneously rejecting other electrocardiogram signals and artifacts which appear during heart muscle contractions.

In accordance with the invention, an arrangement for carrying out the aforementioned objects comprises a miniaturized cardiotachometer in which amplified electrocardiogram signals obtained from a subject via suitable electrodes are applied to a threshold circuit. Of those signals supplied to the input of the threshold circuit only those signals having a rise time which exceeds a predetermined level are passed. The output of the threshold circuit is applied to a multivibrator pulse generator which supplies a substantially square waveform of constant duration to an integrating network. The response of the integrating network to the successive square wave outputs of the multivibrator is a linearly rising or falling wave corresponding to the heartbeat rate.

Complete understanding of the invention and an introduction to other objects and features not specifically mentioned may be had from the following detailed description of a specific embodiment thereof when read in connection with the appended drawings, in which:

FIG. 1 is a wiring diagram of the linear integrating cardiotachometer constructed according to the invention;

FIG. 1a shows a suitable preamplifier for heartbeat signals;

FIG. 2 graphically illustrates the linear relationship between the cardiac rate and the output voltage of the cardiotachometer of the invention; and, FIG. 3 gives an oscillographic comparison of the beat-by-beat variation of an electrocardiogram and the output signal displayed by the cardiotachometer circuit shown in FIG. 1.

Referring now to FIGS. 1, and 1a, electrocardiogram signals are obtained from a subject via any set of appropriate electrodes and are amplified by an EKG preamplifier 8 of conventional type. The response of the preamplifier to each electrocardiogram impulse is a signal which serves as the input to the apparatus of the present invention. The input signal, generally of the form shown, is applied between terminals 10 and 12.

The stage immediately following input terminals 10 and 12 is a first emitter-follower amplifier comprising a transistor 14 having base, emitter, and collector electrodes. The high input impedance of transistor 14 due to the illustrated circuit arrangement thereof is utilized to prevent excessive loading of the preamplifier. The base of transistor 14 is connected to input terminal 10 through a condenser 15 and is returned to the collector through an input resistor 16. The collector of transistor 14 is returned to the positive terminal of a suitable source of direct current (+E) and the emitter is returned to ground through a variable resistor 18, hereinafter referred to as the sensitivity control resistor.

Connected to the tap of resistor 18 is a condenser 20 having its other end returned to ground through a resistor 21. A connection extends from the junction of condenser 20 and resistor 21 to the cathode electrode of two asymmetric units 22 and 23, herein shown as diode rectifiers. The anode of diode 22 is connected directly to ground thereby placing diode 22 in parallel with resistor 21. From the anode of diode 23 a connection to a monostable multivibrator, designated generally by the reference numeral 24, is made through a blocking condenser 25.

With the system stabilized in the steady state, the base-emitter junction of transistor 14 is biased in the forward direction and the collector current which results establishes a voltage across sensitivity control resistor 18 positive with respect to ground. The base electrode of transistor 14 is also supplied with small component signals which are attributed to constantly present disturbances in the system such as noise, or to random signals due to the effects of slowly rising P waves and T waves referred to hereinabove. The effect of the noise signals on the base of transistor 14 is an increase in the collector current which creates a slightly larger voltage across resistor 18. Due to the circuit configuration, a corresponding voltage is developed across resistor 21 since condenser 20 charges through resistor 21 to the voltage available at the tap of resistor 18. A reverse bias effect on diodes 22 and 23 is thus created by the voltage across resistor 21. This voltage represents a threshold level which discriminates against minor variations in the magnitude of input signals applied to terminals 10 and 12, in a manner which will be described.

Monostable vibrator 24 consists of a pair of NPN transistors 26 and 28, preferably chosen with identical characteristics. Transistors 26 and 28 include respective base, emitter, and collector electrodes and each is arranged in a common emitter configuration. The emitters of transistors 26 and 28 are connected directly to ground. Voltage dropping resistors 30 and 32 connect the collectors of these transistors to the positive voltage source (+E). From the collector of transistor 28 a connection extends through a feedback resistor 33 to the base of transistor 26. A condenser 34 provides the rapid application of the regenerative signals from the collector of transistor 26 to the base of transistor 28. The base of transistor 28 is returned to ground via a resistor 35.

In the system of the invention, the constants of multivibrator 24 are so chosen that the multivibrator stabilizes in the steady state with one transistor being cutoff and the other transistor conducting to saturation. Thus, with no input signal applied, transistor 26 of the multivibrator conducts because of the positive return of its base to the positive battery terminal through resistors 32 and 33. The collector potential of transistor 26 is therefore substantially bottomed to ground level. Condenser 34 now charges, through resistors 30 and 35, to a minimum voltage equal in magnitude to any voltage existing at the collector of transistor 26. Following completion of the steady state charging of condenser 34, the voltage across resistor 35 becomes zero. Because of the absence of voltage across resistor 35, the base and emitter of transistor 28 are set to the same voltage level which places transistor 28 in the cutoff condition. The voltage at the collector of transistor 28 is now substantially equal to the voltage at the positive source, and this voltage is applied via resistor 33 to the base of transistor 26 to maintain it in its conductive state.

Following the multivibrator 24 is an amplifier 36 connected in common-emitter configuration and having base, collector, and emitter electrodes. The emitter of transistor 36 extends to the source of direct current (+E), the base is connected to the collector of transistor 28 in multivibrator 24 by means of a resistor 38, and the collector extends through a resistor 39, line 40 and a resistor 42 to ground. The collector output voltage of transistor 36 is utilized by an integrating network, broadly designated 44, interposed between transistor 36 and a second emitter-follower including a transistor 46 having base, emitter, and collector electrodes.

The integrating network 44 of the present invention is conventional in form and, as herein shown, comprises a cascade of L-section filters connected between the collector of transistor 36 and ground. The first filter includes resistor 39 and a condenser designated 50. Succeeding filter sections in integrating unit 44 are identified by the resistor-condenser combinations referenced 39′–50′ and 39″–50″, respectively. The operation of integrating network 44 in the system illustrated will hereinafter be fully described.

In the second emitter follower transistor 46, the base of the transistor is connected to the final section of integrating network 44 by means of a resistor 48. The collector of transistor 46 is coupled directly to the positive voltage source (+E) and the emitter is returned to ground through a variable resistor 52, hereinafter referred to as the output level control resistor. Transistor 46 presents a high impedance to its input signal to prevent excessive loading of the circuit immediately preceding it. In the steady state, the base of transistor 46 is positively biased slightly relative to the emitter which results in a voltage across resistor 52 of a correspondingly small value. Due to the appropriate selection of constants, this voltage across resistor 52 in the quiescent state can be considered negligible compared to the response obtained by the apparatus when electrocardiogram signals are applied. The output terminals 54 and 56 are connected, respectively, to the variable tap of resistor 52 and to ground and deliver a voltage representing the heartbeat rate information of the subject being examined, in a manner which will now be described.

*Operation*

When a signal amplified by the preamplifier, and obtained from a subject via an appropriate set of probes, is applied to the input terminals of the system embodying the invention, the positive portion of the applied signal exciting the base of transistor 14 has no effect except merely to produce a more positive voltage at the tap of resistor 18. The increased positive voltage at the resistor 18 in turn is reflected in a larger positive voltage across resistor 21 as condenser 20 responds to the applied signal by adjusting to the greater voltage developed at the tap of resistor 18. Developing a larger positive voltage across resistor 21 in response to the positive half-cycle of the incoming signal thus adds to the reverse-biasing voltage previously established across resistor 21 by the steady state components. The polarity of the increased voltage is, of course, effective to assist the reverse bias acting on diodes 22 and 23. However, as the negative portion of the incoming signal is applied to the base of transistor 14, the collector current therein is greatly reduced which causes the voltage at the tap of resistor 18 to increase in the negative direction. As the voltage across resistor 18 changes, condenser 20 discharges through resistor 21. In accordance with the present invention, the time constant RC of resistor 21 and condenser 20 determines the maximum rise time of negative signals which can be integrated into the system to overcome the threshold voltage established originally across resistor 21. Therefore, only incoming signals which are periodically present, have a fast rise time, and exceed the predetermined direct current voltage developed at the junction of diodes 22 and 23 are capable of biasing diode 23 in the positive direction. Other input signals which do not have the distinguishing characteristics of the QRS complex, such as P waves, T waves and most forms of noise, are thus discriminated against and have no effect due to their inability to overcome the level established by the threshold circuit. Selecting against unwanted effects of certain unavoidable cardiac irregularities such as extra-systoles, premature contractions, etc. improves the capability and reliability of the system of the invention to an extent found immensely useful in the clinical laboratory. Furthermore, diode 22 acts as a clipper so that large changes in electro-cardiogram voltage have no effect on the form of the signal passing diode 23. The negative pulse resulting from the negative alternation of each incoming signal which is generated by a QRS complex wave is thus passed through diode 23 and condenser 25 and is applied to the base of transistor 26 in multivibrator 24.

From making the base of transistor 26 more negative than the base voltage during the quiescent state, transistor 26 immediately is made nonconducting. With transistor 26 now cutoff, its collector voltage becomes more positive. Since the voltage across condenser 34 cannot change instantaneously, the increasing positive voltage at the collector of transistor 26 appears predominantly across resistor 35 which effect is to cause transistor 28 to conduct. With transistor 28 now conducting, its collector voltage falls in a negative direction to substantially zero. In response to the falling voltage at the collector of transistor 28 the reverse bias voltage at the base of transistor 26 increases which aids in maintaining the latter transistor in the nonconducting condition. The sharply falling voltage at the collector of transistor 28 is applied simultaneously to the base of transistor 36 through resistor 38. Collector current in transistor 36 now increases and the affect consequently positively increases the collector voltage of the transistor 36 relative to the ground reference due to the inversion performed by transistor 36. The response of the integrating network 44 to the increasing positive output voltage of transistor 36 is an amplitude varying wave which rises or falls linearly according to the time interval elapsing between successive signal pulses that are received. Meantime, with the increasing positive collector voltage of transistor 36, the voltage at the base of the second emitter-follower transistor 46 is increasing in the same direction so that transistor 46 is driven to conduct more heavily. This has the effect of increasing the positive voltage at the tap of the output level control resistor 52. By utilizing a suitable recording device 58, such as an oscillograph, connected to the output terminals 54 and 56, there may be indicated, with extreme clarity, a visual reading greatly facilitating cardiographic diagnosis. FIG. 2 graphically shows the linear relationship between the output voltage at the tap of resistor 52 and the cardiac rate of a subject varying between 30–190 beats per minute. For any constant heartbeat rate the output voltage will have a corresponding constant value. Also, the method of the present invention to supply an integrated record of the heartbeat rate is apparent from the oscillographs of FIG. 3 wherein there is shown a comparison of the heartbeat train of a subject and the oscillographic output available for diagnostic examination.

As will be understood from FIG. 3, the oscillograph tracings are plotted against voltage and time coordinates in the usual manner. The upper waveform therefore illustrates the inconstant beat-by-beat variations that normally would be seen in the electrocardiogram of a subject whose heartbeat rate is varying. On the other hand, the lower waveform of FIG. 3 is the integrated output of the cardiotachometer of FIG. 1 having as an input signal the electrocardiogram wave shown in the upper part of FIG. 3. Moreover, the magnitude of the cardiotachometer output waveform is directly related to the heartbeat rate. This is clearly illustrated in FIG. 3 through the superimposed relation of the waveforms and enables the investigator to see by a glance at the lower waveform the effect of experimental procedures on the cardiac rate.

By presenting an output voltage having the characteristics of linearity relative to the rapidity of the heartbeat of the subject, it will be obvious that a diagnostician observing the oscillograph may quickly perceive the effects of his experimental procedures on the cardiac response of the subject and by suitable variation, where provision for such exists, initiate appropriate modification of the environmental system. It will be noted from FIG. 3 that the integrated output voltage of the system of the invention slightly lags the impulse rate of the electrocardiogram output. However, it will readily be appreciated that the extremely satisfactory visual presentation characterizing the integrated record shown by the lower curve of FIG. 3 adequately compensates for the minute time lag incidental to the operation of the invention.

With the input pulse at terminals 10 and 12 now removed, that is, during the interval between input pulses, let us consider the operation of the circuit and its return to the quiescent state. The removal of the input pulse results in lowering the conduction in transistor 14 so that the threshold voltage across resistor 21 established due to noise components previously mentioned is restored. With the upper end of resistor 21 now becoming more positive, diode 23 becomes reverse-biased. The positive voltage which has been developed across resistor 35 in the base circuit of transistor 28 of multivibrator 24 now begins to increase. This change is effected by condenser 34 which begins to charge to a voltage equaling that at the collector of transistor 26 when the transistor is in its cutoff state. As soon as the voltage across resistor 35 sufficiently diminishes in the negative direction, the negative base voltage at transistor 28 begins to assert itself thereby reducing conduction in transistor 28 and creating a collector voltage which becomes more positive. The change in the voltage of transistor 28 is immediately felt at the base of transistor 26 and the latter transistor is made conducting. The collector voltage of transistor 26 now decreases substantially to the zero level, as previously described, which change is effective to render the transistor 28 nonconducting. With transistor 26 now conducting, condenser 34 is discharging from substantially the voltage at the positive supply to the minimum voltage at the collector of transistor 26. The discharge path for condenser 34 includes the collector-to-emitter circuit of transistor 26 and resistor 35. When condenser 34 has again discharged to the minimum voltage appearing at the collector of transistor 26, the multivibrator 24 is returned to the quiescent state. The large positive voltage at the collector of transistor 28 developed as this transistor cuts off decreases the conduction in transistor 36, produces a correspondingly lower positive voltage across integrating network 44, and, accordingly, diminishes the voltage produced across output of control resistor 52. Following the complete oscillation as described the circuit awaits the entry of the succeeding input pulse.

It will thus be understood that for each heartbeat signal received, multivibrator 24 generates a square or abruptly falling wave of a predetermined relatively short and constant duration. The duration of the multivibrator wave is so shortened that it is only a fraction of the duration of the time interval elapsing between heartbeats of the fastest rate for which the test apparatus is designed. In cardiotachometer usage, the frequency rate of heartbeat is anticipated to vary in the range of approximately 30–240 beats per minute for which, at the most rapid rate, the interval between successive heartbeat is approximately $\frac{1}{240}$ min. The need for limiting the width of the square wave output of the multivibrator to an interval much less than the interval at the most rapid rate for which the system is designed is thus obvious. The values of condenser 34 and resistor 35 in multivibrator 24 will, accordingly, be chosen to permit condenser 34 to become wholly discharged to the steady state potential at the collector of transistor 26 in the interval immediately preceding heartbeats produced at the most rapid rate anticipated.

Calibration of the specific apparatus illustrated is recommended in order to obtain optimum diagnostic interpretation of the visual oscillograph displayed. A preamplified input signal of the shape illustrated is applied to the input terminals and thence the sensitivity control resistor 18 is adjusted until no output record is displayed on the oscillograph. The sensitivity control resistor thereafter is adjusted until a displayed wave shape appear. The electrodes applied to the subject's body are then reversed with respect to their connections with the preamplifier and the above adjustments of the sensitivity control are repeated. The proper lead connections are those which provide greatest output voltage with the least adjustment of sensitivity. With the sensitivity control properly adjusted, further adjustment will be unnecessary under a variety of test conditions and the apparatus will operate reliably over a wide range of the strength of input signals. Thus, frequent adjustment of the sensitivity controls as often required on contemporary cardiotachometer instruments is eliminated in the apparatus of the invention.

Although one embodiment of the invention has been illustrated and described, it will be apparent to those skilled in the art that various changes and modifications may be made without departing from the spirit of the invention or the scope of the appended claims.

What I claim is:

1. In a cardiotachometer system including preamplifier means for reproducing heartbeat impulses as signals spaced by an interval defining the heartbeat rate, the combination with said preamplifier means of threshold detecting means effective in the absence of incoming signals for establishing a voltage threshold level which must be exceeded in order to initiate a response, and integrating means responsive to signals exceeding said threshold level for producing an output voltage whose amplitude is linearly proportional to the heartbeat rate.

2. Apparatus for producing an electrical signal which is the function of the rapidity of the heartbeat of a subject, comprising: a resistor adapted to receive a voltage in response to each heartbeat, a second resistor having one end thereof connected to a reference point, a condenser responsive to the voltage developed across said first resistor and charging over a path including said first and second resistors, an asymmetric current conducting device connected in shunt with said second resistor and being adapted to limit voltages of a predetermined polarity developed across said second resistor to a preset level, a second asymmetric current conducting device connected to the other side of said second resistor and being poled to conduct current when said first asymmetric device is biased in the voltage limiting direction, a pulse generator actuated each time said second asymmetric device is conducting for producing a pulse of predetermined width and amplitude, and integrating means coupled to the output of said pulse generator for yielding from said pulses a potential linearly proportional to the heartbeat rate.

3. Apparatus for developing an electric potential proportional to the rapidity of preamplified heartbeat signals of a subject comprising: isolating means for offering a high input impedance to said preamplified signals, a variable sensitivity control resistor connected in the output circuit of said isolating means and having the voltage at its output tap increase and decrease according to the presence and absence, respectively, of heartbeat signals, means coupled asymmetrically to the output tap of said resistor for generating a pulse each time the output voltage of said resistor increase, amplifier means for reversing the polarity of said pulses, integrating means responsive to the output of said amplifier means for developing a voltage linearly varying in amplitude according to the instantaneous rate of the heartbeat signals, a recording device, and second isolating means for coupling the output voltage of said integrating means to said recording device.

References Cited by the Examiner

UNITED STATES PATENTS

| | | | |
|---|---|---|---|
| 2,439,495 | 4/48 | Sturm | 128—2.05 |
| 2,492,617 | 12/49 | Boland | 128—2.06 |
| 2,801,629 | 8/57 | Edmark | 128—2.05 |
| 2,815,748 | 12/57 | Boucke | 128—2.05 |
| 2,865,365 | 12/58 | Newland | 128—2.05 |
| 2,865,366 | 12/58 | Partridge | 128—2.06 |
| 2,918,054 | 12/59 | Goolkasion | 128—2.05 |
| 2,927,573 | 3/60 | Roepke | 128—2.05 |
| 3,303,946 | 4/62 | Richards | 128—2.06 |

OTHER REFERENCES

Molyneux: "A Transistor Cardiotachometer," pp. 125–127 of Electronic Engineering for March 1957.

Roy: "An Electronic Heartbeat Simulator," pp. 48–52 of IRE Transactions of Medical Electronic for July 1958.

RICHARD A. GAUDET, *Primary Examiner.*

RICHARD J. HOFFMAN, LOUIS R. PRINCE, *Examiners.*